Dec. 18, 1934.　　F. R. HIGLEY　　1,984,830
VEHICLE DRIVE
Filed May 5, 1933
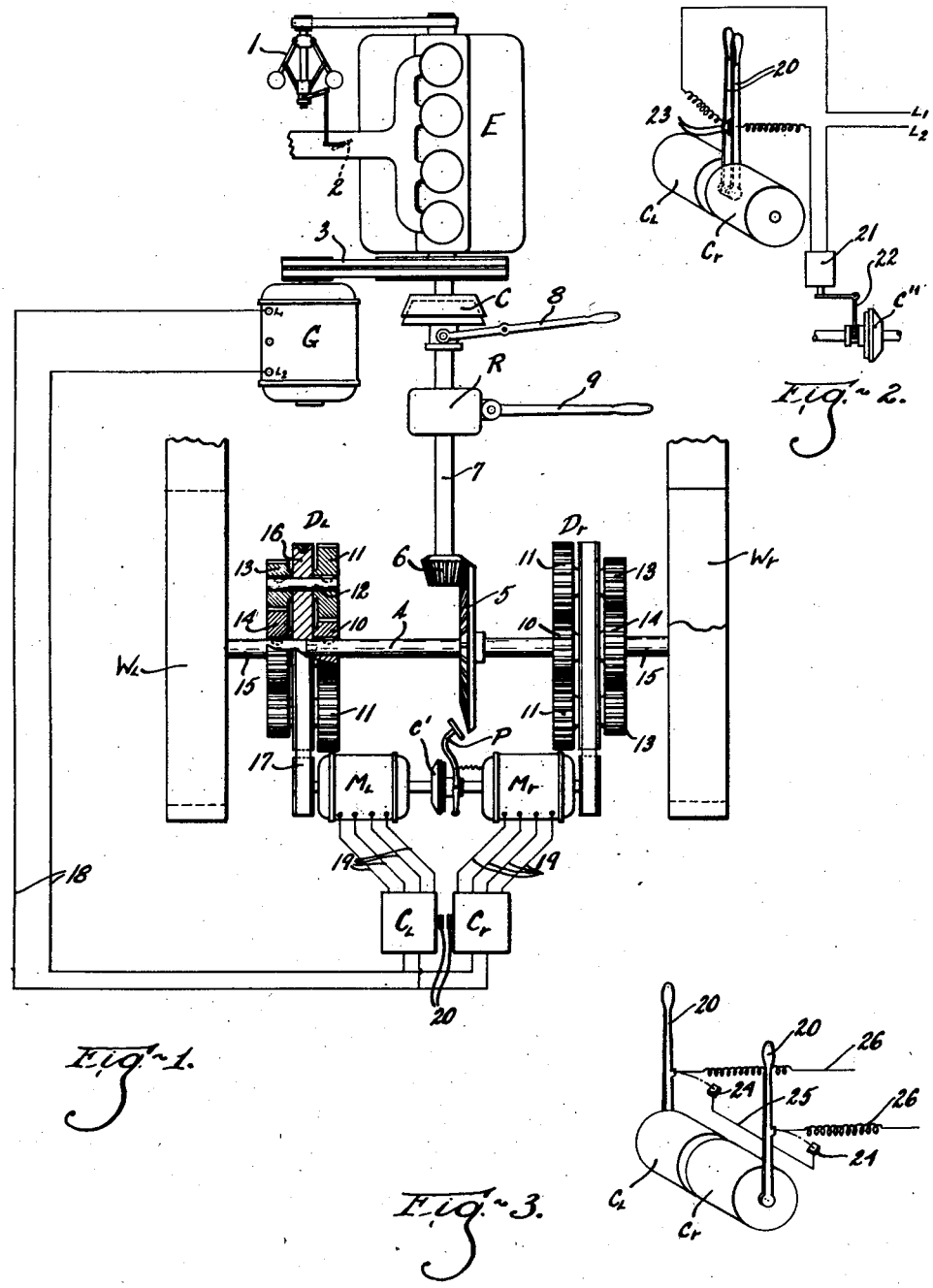
INVENTOR
FRANK R. HIGLEY
BY
Burkett, Hyde, Higley & Meyer
ATTORNEYS Patented Dec. 18, 1934

1,984,830

UNITED STATES PATENT OFFICE 1,984,830

VEHICLE DRIVE

Frank R. Higley, Cleveland Heights, Ohio

Application May 5, 1933, Serial No. 669,495

13 Claims. (Cl. 180—17)

This invention relates to self-propelling vehicles particularly of the heavy-duty slow-moving type wherein steer is had by drive. Such a vehicle is provided with traction means in a pair, one unit on each side. Such traction means may be simply round wheels having rigid circular treads, or may be any of the numerous well-known wheel substitutes such as the "crawler" units which have become widely used.

It is a principal object of my invention to provide means whereby without interrupting the drive to one or the other of the traction units, the drive therebetween may be modified, giving to one or the other unit depending upon the desired direction of travel, any desired preponderance of power depending upon the desired sharpness of turn. In other words, according to this invention the total power from the engine of the vehicle is distributed between the pair of traction means in proportions variable at the will of the operator.

Another important object of the invention is to accomplish such operation without interruption in the total driving power. As will later appear, the invention embraces the employment of an electrical coupling including a pair of motors, one for each side, effective between engine and traction means, yet a further object of the invention is that, nevertheless, the greater portion of power is transmitted positively by mechanical means.

Another object of the invention is a drive operable to provide any desired driving ratio or leverage between the engine and the wheel means driven thereby so that the effect of an infinite number of selective gear ratios is had, in addition to the described selective distribution of power for steering. Thus the usual speed change gearing is eliminated.

General objects of the invention, as will be apparent from the above, are to improve the operating efficiency and maneuverability of the vehicle, and at the same time simplify the demands upon its operator.

Particularly to the latter end, the invention includes the provision of means whereby when the controls are set for travel in one direction, travel will be in that direction without deviation from a straight course.

The exact nature of the invention together with further objects and advantages thereof will be apparent from the following description taken in connection with the accompanying drawing, in which Fig. 1 is a diagrammatic and conventionalized view illustrating the functional relation of the principal propelling parts of an embodiment of the invention, the view being in the nature of a lay-out plan view; Fig. 2 is a detail view, generally in perspective, illustrating partly diagrammatically an arrangement whereby the vehicle is caused to travel a straight course when its controls are set for a straight course; and Fig. 3 illustrates a modification of the arrangement of Fig. 2, whereby the vehicle is caused to travel a straight course when its controls are set in full speed ahead position.

With reference now to the drawing and particularly to Fig. 1 thereof, E is an engine, here indicated as of internal combustion type, which is the prime mover from which the propelling power is had. $Wl$ and $Wr$ indicate respectively the left and right end wheel means or traction means to be driven by the engine E. These traction means may be simply round wheels, in which case the vehicle will have one or more additional caster-mounted wheels, as will be appreciated by one familiar with the art, or the traction means may be of crawler type with endless tread linkages, as indicated in the drawing. At any rate, the traction means are laterally spaced, one at each side of the vehicle, arranged to bear upon the ground in supporting relation with the engine and other vehicle parts through the medium of the usual frame, etc., not appearing in the drawing.

The engine E is preferably arranged for operation at a constant speed maintained by a governor 1 acting on its throttle 2. A generator G is arranged to be constantly driven by the engine, as indicated, by belts 3. A shaft 4, which may be in alignment with the traction means as indicated, is arranged to have drive from the engine E through a gear 5 and cooperative pinion 6, shaft 7, reverse gear R and clutch C. The clutch C is here shown as controlled by a handle 8 and the reverse gear by a handle 9. The reverse gear R may be of any well known type wherein, when its handle 9 is in neutral position, as that shown, there will be no drive to the clutch C to the shaft 7; when the handle is adjusted forwardly, there may be drive of the shaft 7 in the forward direction, and when the handle is adjusted rearwardly, there may be drive of the shaft 7 in the opposite direction. Preferably, the arrangement is such that when the handle 9 is adjusted forwardly from the position shown, the shaft 4 will be driven forwardly.

The left-hand track means $Wl$ has connection with the shaft 4 by a differential gear $Dl$, and similarly the traction means $Wr$ is connected with a shaft 4 by a similar differential Dr. Each differential is here shown as of the epicyclic type comprising a pinion 10 secured with the shaft 4, one or more gears 11 meshing with the pinion 10 and each secured upon a stub shaft 12 on which a pinion 13 is secured, the pinion 13 meshing with a gear 14 secured upon the stub axle 15 of the corresponding traction means. The stub shafts 12 are rotatably mounted in a member 16, which in turn is mounted for rotation coaxial with the shaft 4 subject to drive by the stub shafts 12.

A pair of reversing motors Ml and Mr are arranged to have drive from the generator G, subject to their controllers Cl and Cr through the electrical connections indicated, and each motor is arranged to drive the member 14 of the corresponding differential as through a belt 17. The motors may preferably be series wound.

It will be appreciated that the arrangement for each traction means is one wherein it will be driven differentially by the shaft 4 and its motor; each differential having a pair of input elements, one driven by the shaft 4 and the other by the corresponding motor, and each differential having an output element in driving relation with its corresponding traction means. The proportion and arrangement of the parts is such that each traction means may receive through its differential most of its driving power mechanically from the engine by way of the shaft 4, and less of its power electrically by way of the generator G and connected motor.

The controllers Cl, Cr, are reversing controllers as indicated by their two-wire connections 18 from the generator and their four-wire connections 19 to their motors, and each is provided with an operating handle 20; and the controllers are preferably so arranged that they have neutral setting when their handles are upstanding as indicated in the drawing, that their motors will be caused to operate forwardly when their handles are shifted forwardly and vice versa.

It will be noted that although the traction means both have drive from the shaft 4, because of their differentials they may have different speeds. Means are provided for equalizing their speeds when desired. The motors are preferably aligned as indicated and an auxiliary clutch C' controlled by a pedal P is arranged to connect their rotor shafts as indicated, the clutch C' being preferably arranged to be normally disengaged and engageable by operation of the pedal P.

Operation will be as follows, assuming the vehicle stationary, the engine E and generator G operating at their normal governor-controlled speed, clutch C is disengaged reverse gear R in neutral position and the controllers Cl and Cr in off position.

To go ahead, the reverse gear R is set to operate the shaft 4 in ahead direction, by moving the handle 9 forwardly, and the clutch C is engaged to cause such operation of the shaft 4. The vehicle load being great enough to prevent advancing motion of the traction means, the differentials are set in motion with engagement of the clutch C, to operate the motors backward. The setting of the governor is such that such idling operation of the motors will not exceed a safe speed for their rotors. The controller handles 20 are next advanced to connect the motors with the generator for forward running. Since, however, the motors were idling backward, their rearward speed will first diminish to zero and thereafter, as the controller handles are further advanced, the motors will operate in a forward direction, ultimately attaining maximum forward speed as the controllers are advanced to directly connect the motors with the generator.

The differentials may preferably be so proportioned that when the motors are running ahead at their normal rated speed, the stub shafts 12 will not rotate in the members 16, and the differential gears will have zero pitch speed, so that the traction means will be caused to operate at the speed of the shaft 4. Thus, as the vehicle accelerates from zero to full speed, the motors change from full reverse speed to full, ahead speed, and the differential gears change from maximum pitch speed to zero pitch speed.

As the vehicle meets an increased resistance to travel, the engine speed being maintained, the motor speed will automatically decrease due to the series characteristics of the motors, and the differentials will automatically act to permit a decrease in speed of the traction means, correspondingly increasing the driving leverage of the engine.

Under these ahead conditions, with both motor controllers having the same setting, there will be but slight tendency of the vehicle to swerve from a straight path owing to the inertia of the differentials and the small power thereon of the motors as compared with the leverage of the common driving shaft 4. However, should one traction unit meet with such resistance as to swerve the vehicle, depression by the operator of the pedal P to engage the clutch C' will instantly equalize the speeds of the motors and thus of the traction units. Similarly, by engagement of the clutch C' should one of the traction units have no traction, the power of both motors is made available for combined effect upon the other traction unit.

If at any time it is desired to steer the vehicle from the straight path, as to the left, the left-hand motor controller 20 is moved backwardly to slow down, stop, or reverse its motor Ml, retarding the traction unit Wl and causing the vehicle to turn to the left, so long as the left controller handle 20 is withdrawn from full forward position; the radius of turn depending upon the difference in the setting of the two controller handles 20. A right-hand turn is obviously made correspondingly by setting the right-hand motor controller handle 20 rearwardly of the left-hand handle.

Use may be made of the motors to reduce the speed of the vehicle, as a speed limit brake, by setting their controllers in reverse position. Under these conditions wherein the motors will be idling forwardly at high speed, their reversal will cause them to slow down, correspondingly slowing down the vehicle.

Stopping of the vehicle is accomplished by manipulation of the control handles oppositely and in the opposite sequence from that in starting.

Reverse operation will be apparent, and generally similar to forward operation, with the exception that the reverse gear is set in reverse by rearward shifting of its handle 9, before engagement of the clutch C, and thereafter shifting the motor controller handles 20 rearwardly from the neutral positions shown.

Suppose the vehicle stationary but its engine running, and the clutch C disengaged, it may be turned pivotally on its own wheel base by simply setting the motor control handles to operate the motors in opposite directions. Thus supposing the left-hand motor Ml be caused to operate ahead and the right-hand motor Mr be given reverse operation, the shaft 4 balancing the reaction between the two differentials, the left-hand traction means Wl will be actuated forwardly and the right-hand traction means Wr rearwardly, and the vehicle will rotate in the right-hand direction. Obviously the vehicle may be similarly caused to rotate in the left-hand direction by reversing the described operation of both motors. Such pivotal or rotational turning of the vehicle is highly important where, for example, it is equipped with large low-pressure pneumatic tires wherein turning about one tire would have damaging results upon that tire. Also such turning has great advantage where the vehicle is operating, for example, along a narrow roadway.

It will be observed that the vehicle is operable with equal facility in either ahead or reverse directions, so that the operator may always face in the direction of vehicle travel and perform the same operations for controlling that travel —an arrangement highly desirable where the vehicle is to be employed in shuttle service.

With reference now to Fig. 2, means are provided for automatic control of the clutch C'' dependent upon the setting of the motor control levers 20, whereby whenever their controllers are set to operate the motors at the same speed in the same direction, the clutch C'' will automatically engage so that the vehicle will automatically travel in a straight course.

The arrangement is here indicated conventionally only and comprises the simple expedient of a solenoid 21 in controlling relation with the clutch C'' through the linkage or gear 22. The solenoid is in a circuit between L1 and L2, in series relation with a pair of contactors 23 so associated with the motor control levers 20 that they will make contact to complete the circuit and energize the solenoid whenever the levers are similarly set as shown in the drawing, and otherwise, when the levers 20 have different settings, the contactors 23 will not have engagement and the circuit will be open. As here shown the solenoid 21 and its clutch actuating gear 22 is so arranged that the clutch C'' will be engaged when the solenoid is energized and otherwise the clutch will be disengaged. The circuit may obviously have its electrical supply from the generator G. As will be apparent to one skilled in the art the circuit arrangement here shown is conventional only, whereas in practice the contactors 23 would preferably be arranged merely in a controlling circuit, and such relays, etc., provided as to make unnecessary continuing energization of the solenoid during engagement of the clutch.

It is not usually necessary or desirable that the vehicle be thus positively caused to travel in a straight path, except when travelling at full speed as when the controllers are set in full speed position.

Fig. 3 shows an alternate control arrangement for the circuit of the solenoid 21 controlling the auxiliary or steering control clutch. Here a pair of contactors 24 bridged by a connection 25 are each arranged to be contacted by one of the motor control levers 20 when the latter is in full speed position, the levers 20 being in circuit as indicated by connections 26, with the solenoid 21. The contactors 24 are so located as to be engaged by their motor control levers only when the latter are in full speed position. Thus the auxiliary clutch is caused to engage whenever the controllers of the two motors Ml and Mr are set for full speed motor operation in the same direction. This arrangement is less desirable than that of Fig. 2 in that it is best adapted to cause engagement of the steering control clutch only when travel is in one direction.

What I claim is:

1. In a vehicle having an engine and a pair of traction means, one on each side, a generator driven by the engine, a pair of motors arranged to be independently driven by the generator, a reversing controller for each motor, and for each traction means a driving differential mechanism having a pair of input elements one connected with said engine and the other with one of said motors.

2. In a vehicle of the class described and having an engine and a pair of traction means, one at each side, to be driven thereby, a generator driven by said engine, a pair of motors, one for each traction means, adapted to have drive from said generator, a pair of differential mechanisms each having an input element driven by one of said motors and an output element connected to one of said traction means, each differential mechanism having a second input element, means for simultaneous mechanical drive of said second differential input elements from said engine, and, for each motor, means for controlling its drive from said generator.

3. In a tractor having an engine and a pair of traction means, one on each side, a generator driven by the engine, a pair of motors arranged to be independently driven by the generator, a reversing controller for each motor, for each traction means a driving differential mechanism having a pair of input elements one connected with one of said motors, and means connecting the other input elements of both differential mechanisms with said engine to have coincident drive from the latter and including a common clutch connection leading from the engine.

4. In a vehicle having an engine and a pair of traction means, one for each side, a motor for each traction means, a generator driven by the engine, means providing for independent drive of said motors by said generator, and clutch means adapted to releasably interassociate said motors to permit drive therebetween.

5. In a vehicle having an engine and a pair of traction means, one for each side, a motor for each traction means, a generator driven by the engine, means providing for independent drive of said motors by said generator and including controllers for said motors, and clutch means arranged to releasably interassociate said motors for equalization of their speeds dependent upon setting of said controllers in corresponding positions.

6. In a vehicle having an engine and a pair of traction means, one for each side, a motor for each traction means, a generator driven by the engine, means providing for independent drive of said motors by said generator, and clutch means arranged to be effective to releasably interconnect said traction means to equalize their speeds.

7. In a vehicle having an engine and a pair of traction means, one for each side, a motor for each traction means, a generator driven by the engine, means providing for independent drive of said motors by said generator, clutch means arranged to be effective to releasably interconnect said traction means to equalize their speeds, and means associating said clutch means with said controllers to make engagement of said clutch means dependent upon coincident setting of said controllers for operation of their motors at the same speed.

8. In a vehicle having an engine and a pair of traction means, one for each side, a motor for each traction means, a generator driven by the engine, means providing for independent drive of said motors by said generator, clutch means arranged to be effective to releasably interconnect said traction means to equalize their speeds, and means associating said clutch means with said controllers to make engagement of said clutch means dependent upon coincident setting of said controllers for operation of their motors at maximum speed.

9. In a vehicle having an engine and a pair of laterally spaced traction means, a generator driven by the engine, a pair of motors arranged to have drive from the generator, for each traction means a driving differential mechanism having a pair of input elements one connected with said engine and the other with one of said motors, and means arranged to positively interassociate said motor-driven input elements for equalization of their speeds.

10. In a vehicle having an engine and a pair of laterally spaced traction means, a generator driven by the engine, a pair of motors arranged to have drive from the generator, for each traction means a driving differential mechanism having a pair of input elements one connected with said engine and the other with one of said motors, and clutch means arranged to effect positive interconnection of the motor-driven pair of said input elements to permit drive therebetween.

11. In a vehicle having an engine and a pair of laterally spaced traction means, a generator driven by the engine, a pair of motors arranged to be driven by the generator, separate control means for said motor drives, for each traction means a driving differential mechanism having a pair of input elements one connected with said engine and the other with one of said motors, clutch means arranged to effect interconnection of the motor-driven pair of said input elements for equalization of their speeds, and means interassociating said motor control means with said clutch means for control of the latter dependent upon the setting of the former.

12. In a vehicle having an engine and a pair of laterally spaced traction means, a generator driven by the engine, a pair of motors arranged to be driven by the generator, separate control means for said motor drives, for each traction means a driving differential mechanism having a pair of input elements one connected with said engine and the other with one of said motors, clutch means arranged to effect interconnection of the motor-driven pair of said input elements for equalization of their speeds, and means interassociating said motor control means with said clutch means for control of the latter dependent upon coincident setting of both control means in a common relative position.

13. In a vehicle having an engine and a pair of laterally spaced traction means, a generator driven by the engine, a pair of motors arranged to be driven by the generator, separate control means for said motor drives, for each traction means a driving differential mechanism having a pair of input elements one connected with said engine and the other with one of said motors, clutch means arranged to effect interconnection of the motor-driven pair of said input elements for equalization of their speeds, and means interassociating said motor control means with said clutch means for control of the latter dependent upon coincident setting of both control means in full speed ahead position.

FRANK R. HIGLEY.